United States Patent
Ogata et al.

(10) Patent No.: US 8,287,409 B2
(45) Date of Patent: Oct. 16, 2012

(54) HYDRAULIC CONTROL SYSTEM AND METHOD OF CONTINUOUSLY VARIABLE TRANSMISSION

(75) Inventors: Yusuke Ogata, Toyota (JP); Toshihiro Aoyama, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 110 days.

(21) Appl. No.: 12/678,601

(22) PCT Filed: Dec. 23, 2008

(86) PCT No.: PCT/IB2008/003599
§ 371 (c)(1),
(2), (4) Date: Mar. 17, 2010

(87) PCT Pub. No.: WO2009/087455
PCT Pub. Date: Jul. 16, 2009

(65) Prior Publication Data
US 2010/0255942 A1 Oct. 7, 2010

(30) Foreign Application Priority Data
Dec. 27, 2007 (JP) .................................. 2007-337672

(51) Int. Cl.
| F16H 59/00 | (2006.01) |
| F16H 61/00 | (2006.01) |
| F16H 63/00 | (2006.01) |
| F16H 61/662 | (2006.01) |
| F16H 61/664 | (2006.01) |
| F16H 47/00 | (2006.01) |

(52) U.S. Cl. ................ 474/18; 474/12; 474/28; 477/44; 477/45; 477/46; 477/50; 477/906; 701/62; 701/76; 74/731.1

(58) Field of Classification Search .................... 474/12, 474/18, 28; 477/44, 45, 46, 48, 49, 906, 477/50, 56; 475/210, 25; 701/62, 76; 74/730.1, 74/731.1; F16H 61/02, 59/68
See application file for complete search history.

(56) References Cited

U.S. PATENT DOCUMENTS
4,798,561 A * 1/1989 Hattori et al. ................... 474/28
(Continued)

FOREIGN PATENT DOCUMENTS
JP 06-074839 B2 9/1994
(Continued)

OTHER PUBLICATIONS
JP2005163869 Translation.pdf.*

*Primary Examiner* — Michael Mansen
*Assistant Examiner* — Minh Truong
(74) *Attorney, Agent, or Firm* — Sughrue Mion, PLLC

(57) ABSTRACT

A hydraulic control system of continuously variable transmission includes: a first sheave pressure regulating valve (17) that regulates a line pressure (Pl), which is used for hydraulic control as a source pressure, to obtain a first sheave pressure (Pin); a fail-safe valve (19) that selects and outputs any one of the first sheave pressure (Pin) or a fail-safe hydraulic pressure (second sheave pressure Pout) that is applied to a drive pulley (21) at the time of a failure due to an excessive first sheave pressure (Pin) to the drive pulley (21); and a first regulator valve (12) and a second regulator valve (13) that regulate the line pressure (Pl). An output pressure (Psf) of the fail-safe valve (19) is supplied to the first and second regulator valves (12 and 13) in a feedback manner as a drive pulley (21) side hydraulic pressure to thereby regulate the line pressure (Pl).

14 Claims, 6 Drawing Sheets

U.S. PATENT DOCUMENTS

| | | | |
|---|---|---|---|
| 5,050,715 A * | 9/1991 | Itoh et al. | 192/3.3 |
| 5,169,366 A * | 12/1992 | Reniers | 474/28 |
| 5,427,579 A * | 6/1995 | Kanehara et al. | 474/28 |
| 5,665,023 A * | 9/1997 | Aoki et al. | 477/48 |
| 6,110,062 A * | 8/2000 | Fujikawa | 474/28 |
| 6,612,958 B2 * | 9/2003 | Imai et al. | 475/210 |
| 6,623,386 B1 * | 9/2003 | Mizui | 474/28 |
| 8,012,051 B2 * | 9/2011 | Soga | 474/18 |
| 2002/0028724 A1 * | 3/2002 | Kanda et al. | 477/45 |
| 2004/0214669 A1 * | 10/2004 | Katou et al. | 474/28 |
| 2009/0069131 A1 * | 3/2009 | Soga | 474/18 |

FOREIGN PATENT DOCUMENTS

| | | |
|---|---|---|
| JP | 2001-280455 A | 10/2001 |
| JP | 2005-163869 A | 6/2005 |

* cited by examiner

Psrv=MAX(Psf1, Psf2)

HYDRAULIC CONTROL SYSTEM AND METHOD OF CONTINUOUSLY VARIABLE TRANSMISSION

BACKGROUND OF THE INVENTION

1. Field of the Invention

The invention relates to a hydraulic control system and method that is applied to a belt-type continuously variable transmission that changes the belt turning radii of a drive pulley and a driven pulley, around which a belt is wound, on the basis of sheave pressures applied respectively to the pulleys to shift gears, wherein the hydraulic control system performs hydraulic control to regulate the sheave pressures.

2. Description of the Related Art

A belt-type continuously variable transmission is in practical use as a transmission for a vehicle, or the like. For example, as shown in FIG. 5, the belt-type continuously variable transmission includes a drive pulley 100 and a driven pulley 101, of which the respective groove widths are variable, and a metal belt 102 wound around these pulleys. Then, the groove width of each of the drive pulley 100 and the driven pulley 101 is varied to change the turning radius of the belt 102 on those pulleys, thus steplessly shifting gears.

The groove widths of the drive pulley 100 and driven pulley 101 of the belt-type continuously variable transmission are varied by regulating hydraulic pressures (a first sheave pressure Pin and a second sheave pressure Pout) applied respectively to the pulleys. Therefore, the belt-type continuously variable transmission is equipped with a hydraulic control system that performs hydraulic control to regulate the sheave pressures.

As shown in FIG. 5, in the hydraulic control system of the belt-type continuously variable transmission, hydraulic oil supplied from a pump is regulated in pressure at a first regulator valve 111 and a second regulator valve 112 to thereby obtain a line pressure Pl, which is used for hydraulic control as a source pressure. In addition, the line pressure Pl is reduced in pressure at a modulator valve 113 to obtain a constant modulator pressure Pm.

The modulator pressure Pm output from the modulator valve 113 is supplied to a first solenoid valve 114 and a second solenoid valve 115. The first solenoid valve 114 and the second solenoid valve 115 respectively regulate the modulator pressures Pm by controlling an electric current supplied to respective internal linear solenoids to thereby obtain and output a desired first solenoid pressure Pslp and a desired second solenoid pressure Psls.

The first solenoid pressure Pslp output from the first solenoid valve 114 is transmitted to a first sheave pressure regulating valve 116. Then, the first sheave pressure regulating valve 116 regulates the line pressure Pl on the basis of the first solenoid pressure Pslp to obtain a first sheave pressure Pin applied to the drive pulley 100. On the other hand, the second solenoid pressure Psls output from the second solenoid valve 115 is transmitted to a second sheave pressure regulating valve 117. Then, the second sheave pressure regulating valve 117 regulates the line pressure Pl on the basis of the second solenoid pressure Psls to obtain a second sheave pressure Pout applied to the driven pulley 101. Thus, in the hydraulic control system, the first sheave pressure Pin and the second sheave pressure Pout, which are applied respectively to the drive pulley 100 and the driven pulley 101, are regulated by controlling electric currents supplied respectively to the linear solenoids of the first solenoid valve 114 and second solenoid valve 115 to thereby variably set the groove widths of the drive pulley 100 and driven pulley 101. By so doing, the gear shift control of the transmission is performed.

Incidentally, in the thus configured hydraulic control system of the continuously variable transmission, as the line pressure Pl increases, a driving load of an oil pump also increases. This leads to deterioration in fuel economy. For this reason, in the hydraulic control system, the line pressure Pl is regulated in a feedback manner on the basis of the first sheave pressure Pin and the second sheave pressure Pout to thereby suppress an unnecessary increase in line pressure Pl.

The hydraulic control system shown in FIG. 5 regulates the line pressure Pl in a feedback manner. In this hydraulic control system, the first sheave pressure Pin and the second sheave pressure Pout respectively output from the first sheave pressure regulating valve 116 and the second sheave pressure regulating valve 117 are also transmitted to the second regulator valve 112. Then, the second regulator valve 112 selects the higher one of the supplied first sheave pressure Pin and second sheave pressure Pout, and produces a line pressure regulating hydraulic pressure Psrv on the basis of the selected pressure. The line pressure regulating hydraulic pressure Psrv is transmitted to the first regulator valve 111. Then, the first regulator valve 111 regulates the line pressure Pl on the basis of the supplied line pressure regulating hydraulic pressure Psrv. The thus regulated line pressure Pl is a pressure that is slightly higher than the higher one of the first sheave pressure Pin and the second sheave pressure Pout at that time, as shown in FIG. 6.

Incidentally, the first sheave pressure regulating valve 116 and/or the second sheave pressure regulating valve 117 may possibly fail so that the output sheave pressure becomes relatively high, for example, due to entrapment of foreign matter, or the like. When the above failure that the sheave pressure becomes excessive, that is, a failure due to an excessive sheave pressure, occurs, the line pressure Pl that is regulated by that sheave pressure in a feedback manner also increases with the increase in sheave pressure. Then, the sheave pressure further increases with the increase in line pressure, and then the line pressure further increases with the increase in the sheave pressure. In this way, a vicious cycle occurs, and the sheave pressure continuously increases. This may deteriorate the durability of the belt 102. In addition, the excessive increase in line pressure Pl deteriorates the durability of the oil pump.

As described, for example, in Japanese Patent Application Publication No. 2005-163869 (JP-A-2005-163869), a hydraulic control system of a continuously variable transmission is described, which is equipped with a fail-safe valve to prevent the above described excessive increase in hydraulic pressures applied respectively to the pulleys at the time of a failure due to an excessive sheave pressure. As shown in FIG. 7, in this hydraulic control system, a fail-safe valve 120 is provided between the first sheave pressure regulating valve 116 and the drive pulley 100. The fail-safe valve 120 normally outputs the first sheave pressure Pin output from the first sheave pressure regulating valve 116 to the drive pulley 100, while the fail-safe valve 120 outputs the second sheave pressure Pout output from the second sheave pressure regulating valve 117 to the drive pulley 100 at the time of a failure due to an excessive first sheave pressure Pin.

If the thus configured fail-safe valve 120 is provided, no excessive hydraulic pressure is applied to the drive pulley 100 at the time of a failure due to an excessive first sheave pressure Pin and, as a result, it is possible to prevent deterioration in durability of the belt 102. However, even with the fait-safe valve 120, it is difficult to prevent an excessive increase in line pressure Pl due to the above described vicious cycle, and it is difficult to avoid a trouble such as a decrease in durability of the oil pump in accordance with the excessive increase in line pressure Pl.

SUMMARY OF THE INVENTION

The invention provides a hydraulic control system and method of a continuously variable transmission, which suppresses an excessive increase in line pressure at the time of a failure due to an excessive sheave pressure.

A first aspect of the invention provides a hydraulic control system of a continuously variable transmission. The hydraulic control system is applied to a belt-type continuously variable transmission that includes a drive pulley and a driven pulley, around which a belt is wound, and that changes the belt turning radii of the pulleys on the basis of hydraulic pressures applied respectively to the pulleys to shift gears. The hydraulic control system performs hydraulic control to regulate the hydraulic pressures applied respectively to the pulleys. The hydraulic control system includes: a first sheave pressure regulating valve that regulates a line pressure, which is used for the hydraulic control as a source pressure, to obtain a first sheave pressure; a fail-safe valve that selects and outputs any one of the first sheave pressure and a fail-safe hydraulic pressure to one of the pulleys; and a line pressure regulating portion that regulates the line pressure on the basis of an output pressure from the fail-safe valve.

In the first aspect, the fail-safe valve may select the fail-safe hydraulic pressure when the first sheave pressure is higher than a predetermined upper limit pressure.

According to the above aspect, deterioration in durability of the belt, the cylinders of the pulleys, and the like, because of an excessive increase in hydraulic pressure applied to the pulley at the time of a failure due to an excessive sheave pressure is prevented.

In addition, according to the first aspect, the line pressure regulating portion regulates the line pressure on the basis of the output pressure from the fail-safe valve. Thus, even when the sheave pressure is excessive, it is possible to prevent the line pressure from becoming excessive in response to the excessive sheave pressure, to thereby make it possible to avoid an excessive increase in sheave pressure and line pressure due to the above described vicious cycle. Then, it is possible to suppress an excessive increase in line pressure at the time of a failure due to an excessive sheave pressure.

In addition, the fail-safe valve may select the fail-safe hydraulic pressure when the first sheave pressure is lower than a predetermined lower limit pressure.

In the first aspect, an orifice may be further provided in an oil passage between the fail-safe valve and the one of the pulleys. The line pressure regulating portion may regulate the line pressure on the basis of a hydraulic pressure in the oil passage on the fail-safe valve side of the orifice.

According to the above aspect, it is possible to selectively use any one of a hydraulic pressure in the oil passage on the fail-safe valve side of the orifice (pre-orifice output pressure) or a hydraulic pressure on the one of the pulleys side of the orifice in the same oil passage (post-orifice output pressure) as an output pressure from the fail-safe valve to regulate the line pressure.

With the above configuration, the line pressure is regulated on the basis of the pre-orifice output pressure. The pre-orifice output pressure more quickly tracks a variation in sheave pressure than the post-orifice output pressure. Thus, it is possible to further quickly increase the line pressure in response to an increase in sheave pressure at the time of a hard upshift (variation in gear ratio of the continuously variable transmission to increase the speed) and, as a result, it is possible to improve the gear shift speed.

In the first aspect, an orifice may be further provided in an oil passage between the fail-safe valve and the one of the pulleys. The line pressure regulating portion may regulate the line pressure on the basis of a hydraulic pressure in the oil passage on the one of the pulleys side of the orifice.

According to the above aspect, the post-orifice output pressure is closer to the hydraulic pressure that is actually applied to the one of the pulleys than the pre-orifice output pressure. Thus, when the post-orifice output pressure is supplied in a feedback manner to regulate the line pressure, it is possible to bring the line pressure further close to an actually required hydraulic pressure and, as a result, it is possible to improve the accuracy of the differential pressure between the line pressure and the hydraulic pressure applied to the one of the pulleys. Thus, the line pressure may be controlled further close to a minimum necessary hydraulic pressure and, as a result, the line pressure may be further reduced by that much. Hence, it is possible to reduce operation of the oil pump to thereby improve fuel economy.

In the above aspect, the one of the pulleys may be the drive pulley.

In the above aspect, a second sheave pressure regulating valve that outputs a second sheave pressure may be further provided. Then, the fail-safe hydraulic pressure may be the second sheave pressure.

A second aspect of the invention provides a hydraulic control system of a belt-type continuously variable transmission that includes a drive pulley and a driven pulley, around which a belt is wound, and that changes the belt turning radii of the pulleys on the basis of hydraulic pressures applied respectively to the pulleys to shift gears. The hydraulic control system includes: a first sheave pressure regulating valve that regulates a line pressure, which is used for hydraulic control as a source pressure, to obtain a first sheave pressure output to the drive pulley; a second sheave pressure regulating valve that regulates the line pressure to obtain a second sheave pressure output to the driven pulley; a fail-safe valve that selects and outputs any one of the first sheave pressure and second sheave pressure or a fail-safe hydraulic pressure to the drive pulley and the driven pulley; and a line pressure regulating portion that regulates the line pressure on the basis of an output pressure from the fail-safe valve.

In the second aspect, the fail-safe valve may select the fail-safe hydraulic pressure when the sheave pressure is higher than a predetermined upper limit pressure.

In the above aspect, the fail-safe valve may select and output any one of the first sheave pressure or the fail-safe hydraulic pressure to the drive pulley and the line pressure regulating portion as a first output pressure, and the fail-safe valve may select and output any one of the second sheave pressure or the fail-safe hydraulic pressure to the driven pulley and the line pressure regulating portion as a second output pressure. The line pressure regulating portion may regulate the line pressure on the basis of the higher one of the first output pressure and the second output pressure.

In the above aspect, an orifice may be provided in an oil passage between the fail-safe valve and the drive pulley. A hydraulic pressure in the oil passage on the fail-safe valve side of the orifice may be input to the line pressure regulating portion. Alternatively, a hydraulic pressure in the oil passage on the drive pulley side of the orifice may be input to the line pressure regulating portion.

A third aspect of the invention provides a hydraulic control method that is applied to a belt-type continuously variable transmission that includes a drive pulley and a driven pulley, around which a belt is wound, and that changes the belt turning radii of the pulleys on the basis of hydraulic pressures applied respectively to the pulleys to shift gears, wherein the hydraulic control method is used to perform hydraulic control to regulate the hydraulic pressures applied respectively to the pulleys. The hydraulic control method includes: regulating a line pressure, which is used for the hydraulic control as a source pressure, to obtain a sheave pressure; selecting and outputting any one of the sheave pressure or a fail-safe hydraulic pressure to one of the pulleys; and regulating the line pressure on the basis of the selected one of the sheave pressure or the fail-safe hydraulic pressure.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
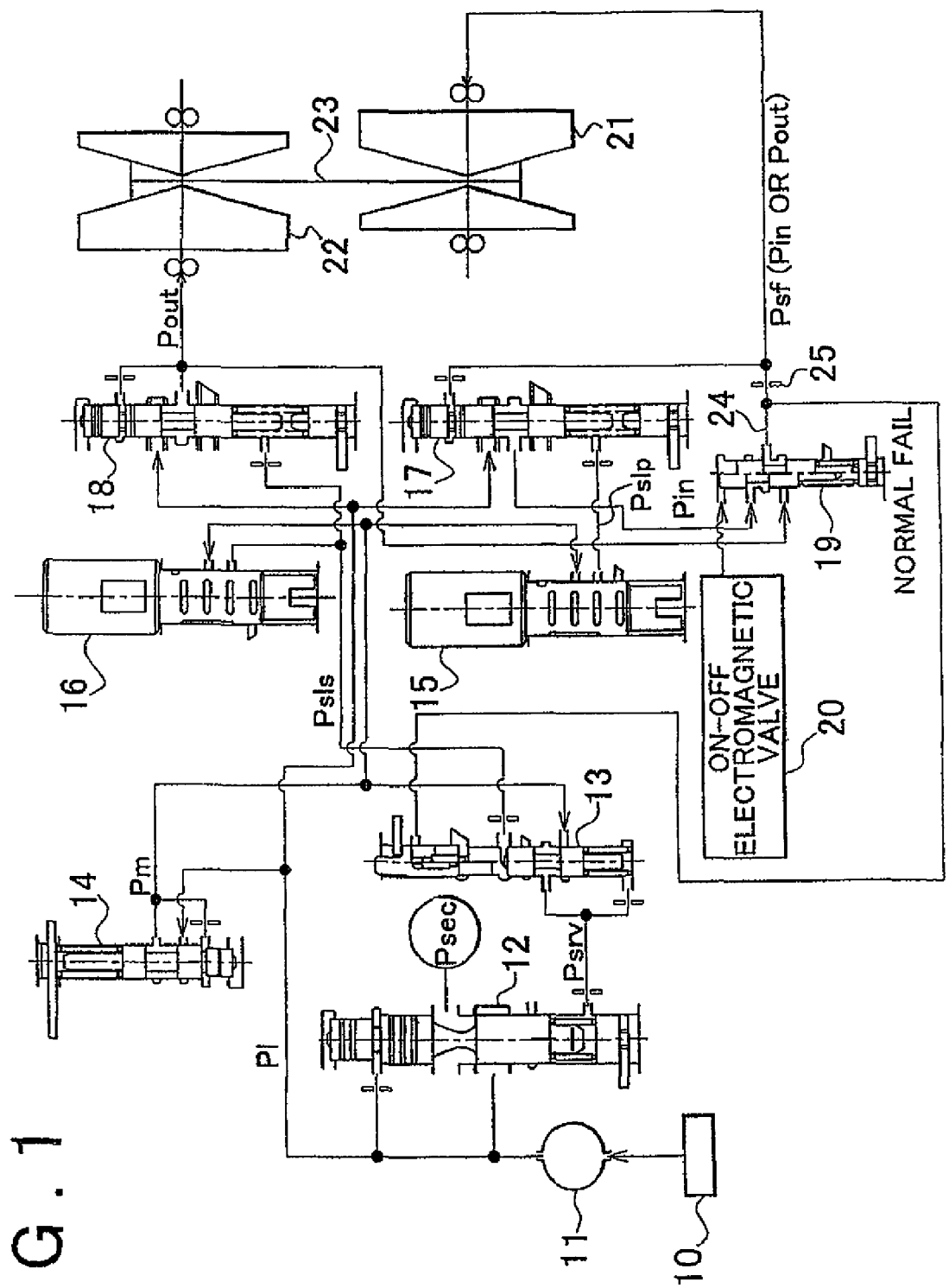
FIG. 1 is a view that schematically shows the configuration of a hydraulic control system according to a first embodiment of the invention.
Figure 2:
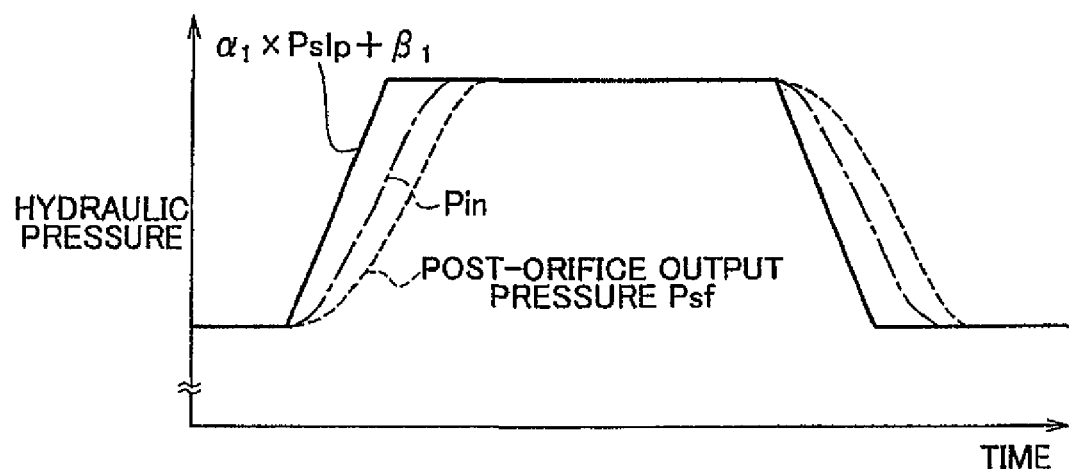
FIG. 2 is a time chart that shows hydraulic pressures over time during shifting in the hydraulic control system of a continuously variable transmission according to the first embodiment.

Hereinafter, a hydraulic control system of a continuously variable transmission according to a first embodiment of the invention will be described in greater detail with reference to FIG. 1 and FIG. 2. The hydraulic control system of the continuously variable transmission according to the present embodiment controls hydraulic pressures of a belt-type continuously variable transmission mounted on a vehicle.

The hydraulic control system of the present embodiment is equipped with a first regulator valve 12 that regulates the pressure of hydraulic oil pumped by an oil pump 11 through a strainer 10 for removing impurities to obtain a line pressure Pl, which is used for hydraulic control as a source pressure. Note that the first regulator valve 12 regulates the pressure of the hydraulic oil pumped by the oil pump 11 and transmits the hydraulic oil to another regulator valve (not shown). The regulator valve produces a hydraulic oil pressure Psec for a torque converter and a forward/reverse switching mechanism.

In addition, the hydraulic control system includes a modulator valve 14 that reduces the line pressure Pl to obtain a constant modulator pressure Pm. The modulator pressure Pm output from the modulator valve 14 is supplied to a first solenoid valve 15 and a second solenoid valve 16. The first solenoid valve 15 and the second solenoid valve 16 respectively regulate the modulator pressure Pm by controlling electric currents supplied to the internal linear solenoids to obtain a desired first solenoid pressure Pslp and a desired second solenoid pressure Psls.

The first solenoid pressure Pslp produced by the first solenoid valve 15 is transmitted to a first sheave pressure regulating valve 17. The first sheave pressure regulating valve 17 regulates the line pressure Pl on the basis of the first solenoid pressure Pslp to obtain a first sheave pressure Pin. Here, the relationship between the first solenoid pressure Pslp and the first sheave pressure Pin is expressed as the following Expression (1). In the following Expression (1), "α1" denotes a gain of the first sheave pressure Pin against the first solenoid pressure Pslp in the first sheave pressure regulating valve 17, and "β1" denotes a constant. These gain α1 and constant β1 are determined on the basis of the mechanical configuration, size, spring load, and the like, of the first sheave pressure regulating valve 17.

$$Pin = \alpha 1 \times Pslp + \beta 1 \quad (1)$$

On the other hand, the second solenoid pressure Psls produced by the second solenoid valve 16 is transmitted to a second sheave pressure regulating valve 18. The second sheave pressure regulating valve 18 regulates the line pressure Pl on the basis of the second solenoid pressure Psls to obtain a second sheave pressure Pout. Here, the relationship between the second solenoid pressure Psls and the second sheave pressure Pout is expressed as the following Expression (2). In the following Expression (2), "α2" denotes a gain of the second sheave pressure Pout against the second solenoid pressure Psls at the second sheave pressure regulating valve 18, and "β2" denotes a constant. These gain α2 and constant β2 are determined on the basis of the mechanical configuration, size, spring load, and the like, of the second sheave pressure regulating valve 18. Note that in the hydraulic control system of the present embodiment, the gain α2 at the second sheave pressure regulating valve 18 is equal to the gain α1 at the first sheave pressure regulating valve 17.

$$Pout = \alpha 2 \times Psls + \beta 2 \quad (2)$$

The first sheave pressure Pin produced by the first sheave pressure regulating valve 17 is transmitted to a drive pulley 21 through a fail-safe valve 19. Then, the groove width of the drive pulley 21 is changed on the basis of the applied first sheave pressure Pin. On the other hand, the second sheave pressure Pout produced by the second sheave pressure regulating valve 18 is directly transmitted to a driven pulley 22. Then, the groove width of the driven pulley 22 is changed on the basis of the applied second sheave pressure Pout.

With the variation in groove width of each of the drive pulley 21 and the driven pulley 22, the turning radius of a metal belt 23 wound around each of the drive pulley 21 and the driven pulley 22 varies. This varies the ratio of the rotational speeds of the drive pulley 21 and the driven pulley 22 that rotate together through the belt 23, that is, the gear ratio of the continuously variable transmission. Specifically, the first sheave pressure Pin is increased to reduce the groove width of the drive pulley 21 to thereby increase its belt turning radius, while the second sheave pressure Pout is reduced to increase the groove width of the driven pulley 22 to thereby reduce its belt turning radius. Thus, the gear ratio of the continuously variable transmission is varied to increase the speed. In addition, the first sheave pressure Pin is reduced to increase the groove width of the drive pulley 21 to thereby reduce its belt turning radius, while the second sheave pressure Pout is increased to reduce the groove width of the driven pulley 22 to thereby increase its belt turning radius. Thus, the gear ratio of the continuously variable transmission is varied to decrease the speed.

Incidentally, as described above, the fail-safe valve 19 is provided between the first sheave pressure regulating valve 17 and the drive pulley 21. The first sheave pressure Pin output from the first sheave pressure regulating valve 17 and the second sheave pressure Pout output from the second sheave pressure regulating valve 18 are respectively introduced to two input ports of the fail-safe valve 19. Then, the fail-safe valve 19 selectively communicates any one of the input port that introduces the first sheave pressure Pin or the input port that introduces the second sheave pressure Pout with the output port on the basis of the position of a valve element that moves in accordance with a hydraulic pressure applied by an on-off electromagnetic valve 20. Specifically, in a state (NORMAL) where the on-off electromagnetic valve 20 is turned off and no hydraulic pressure is applied to the valve element, the input port that introduces the first sheave pressure Pin communicates with the output port. On the other hand, in a state (FAIL) where the on-off electromagnetic valve 20 is turned on and a hydraulic pressure is applied to the valve element, the input port that introduces the second sheave pressure Pout communicates with the output port. Thus, the fail-safe valve 19 selects any one of the first sheave pressure Pin or the second sheave pressure Pout and outputs the selected pressure to the drive pulley 21.

Note that the on-off electromagnetic valve 20 is turned on when any one of the following conditions is satisfied. Any one of the conditions is satisfied when there is a possibility that the first sheave pressure Pin is insufficient (when the first sheave pressure Pin is lower than a predetermined lower limit pressure) and the gear ratio of the continuously variable transmission steeply varies to decrease the speed or when the first sheave pressure Pin excessively increases (when the first sheave pressure Pin is higher than a predetermined upper limit pressure) due to entrapment of foreign matter in the first sheave pressure regulating valve 17, or the like (at the time of a failure due to an excessive first sheave pressure Pin). When the first sheave pressure Pin is insufficient and, therefore, the gear ratio of the continuously variable transmission steeply varies to decrease the speed, the engine rotational speed may abruptly increase to cause an over revolution state or the wheels may lock. In addition, when the first sheave pressure Pin excessively increases and, therefore, a hydraulic pressure applied to the drive pulley 21 is excessive, the durability of the belt 23 and the hydraulic cylinder of the drive pulley 21 may deteriorate.

For this reason, in the hydraulic control system, in order to avoid the above inconvenience, when any one of the above conditions is satisfied, the on-off electromagnetic valve 20 is turned on to output the second sheave pressure Pout, which is normally applied to the driven pulley 22, through the fail-safe valve 19 to the drive pulley 21 in place of the first sheave pressure Pin. Thus, the fail-safe valve 19 not only prevents a steep decrease in speed when the first sheave pressure Pin is reduced but also prevents an excessive hydraulic pressure from being applied to the drive pulley 21 at the time of a failure due to an excessive first sheave pressure Pin. Note that in the hydraulic control system of the present embodiment, the fail-safe valve 19 normally applies the first sheave pressure Pin to the drive pulley 21, and applies the second sheave pressure Pout as a fail-safe hydraulic pressure to the drive pulley 21 at the time of a failure due to an excessive first sheave pressure Pin.

Incidentally, an orifice 25 is provided in an oil passage 24 that connects the output port of the fail-safe valve 19 with the drive pulley 21. The orifice 25 is provided in order to prevent occurrence of slip of the belt 23 due to a steep reduction in hydraulic pressure applied to the drive pulley 21 when the first sheave pressure regulating valve 17 or the first solenoid valve 15 fails and, therefore, the first sheave pressure Pin is insufficient or when the fail-safe valve 19 switches an output pressure Psf from the first sheave pressure Pin to the second sheave pressure Pout.

In the hydraulic control system of the continuously variable transmission according to the present embodiment, to maintain the line pressure Pl at a minimum necessary value, the line pressure Pl is regulated in a feedback manner. In the present embodiment, the output pressure Psf from the fail-safe valve 19 is supplied in a feedback manner from the drive pulley 21 side, and the second solenoid pressure Psls output from the second solenoid valve 16 is supplied in a feedback manner from the driven pulley 22 side to thereby regulate the line pressure Pl.

A specific configuration to regulate the line pressure Pl in a feedback manner is as follows. In the hydraulic control system of the present embodiment, the output pressure Psf from the fail-safe valve 19 (here, the hydraulic pressure in the oil passage 24 on the fail-safe valve 19 side of the orifice 25) and the second solenoid pressure Psls output from the second solenoid valve 16 are transmitted to the second regulator valve 13. Thus, the output pressure Psf from the fail-safe valve 19, which serves as a drive pulley 21 side hydraulic pressure, and the second solenoid pressure Psls, which serves as a driven pulley 22 side hydraulic pressure, are supplied to the second regulator valve 13 in a feedback manner. Then, the second regulator valve 13 regulates the modulator pressure Pm on the basis of these output pressure Psf and second solenoid pressure Psls to obtain the line pressure regulating hydraulic pressure Psrv. The line pressure regulating hydraulic pressure Psrv is transmitted to the first regulator valve 12 and is used to regulate the line pressure Pl at the first regulator valve 12. In the present embodiment, the line pressure Pl is regulated on the basis of the output pressure Psf from the fail-safe valve 19.

Note that the relationship among the line pressure regulating hydraulic pressure Psrv, the output pressure Psf and the second solenoid pressure Psls at the second regulator valve 13 is expressed by the following Expression (3). In the Expression (3), "v" denotes a predetermined gain, and "ΔP" denotes a predetermined constant. In addition, in Expression (3), "α2" denotes a gain of the second sheave pressure Pout against the second solenoid pressure Psls at the second sheave pressure regulating valve 18 as described above. These gain v and constant ΔP are determined on the basis of the mechanical configuration, size, spring load, and the like, of the second regulator valve 13.

$$Psrv = \text{MAX}(0, v \times (\text{MAX}(Psf/\alpha 2, Psls) - \Delta P)) \quad (3)$$

On the other hand, the relationship between the line pressure Pl and the line pressure regulating hydraulic pressure Psrv at the first regulator valve 12 is expressed as the following Expression (4). In Expression (4), "α" denotes a predetermined gain and is equal to the above gains α1 and α2 (α=α1=α2). In addition, in Expression (4), "β" denotes a predetermined constant, and is larger than the above constants β1 and β2 (β>β1, β2). Note that as expressed by the following Expression (4), the gain of the line pressure regulating hydraulic pressure Psrv against the line pressure Pl at the first regulator valve 12 is "α/v". The gain "α/v" and constant β at the first regulator valve 12 are determined on the basis of the mechanical configuration, size, spring load, and the like, of the first regulator valve 12.

$$Pl=\alpha/v \times Psrv+\beta=\alpha \times MAX(0, MAX(Psf/\alpha2, Psls)-\Delta P)+\beta \quad (4)$$

Here, as described above, the normal output pressure Psf from the fail-safe valve 19 is the first sheave pressure Pin. In addition, the product (α×Psls) of the second solenoid pressure Psls and the gain α (=α2) is substantially equal to the second sheave pressure Pout (α×Psls≈Pout) because of "β2<<Pout". Thus, the normal line pressure Pl is regulated to a hydraulic pressure that is slightly higher than the higher one of the first sheave pressure Pin and the second sheave pressure Pout.

On the other hand, when the first sheave pressure Pin is excessive, the on-off electromagnetic valve 20 is turned on, and the output pressure Psf from the fail-safe valve 19 is switched from the first sheave pressure Pin to the second sheave pressure Pout. Then, the output pressure Psf from the fail-safe valve 19, which is the second sheave pressure Pout, is supplied to the second regulator valve 13 in a feedback manner as the drive pulley 21 side hydraulic pressure. Thus, the line pressure Pl at this time is slightly higher than the second sheave pressure Pout, and is prevented from becoming excessive in response to a failure due to an excessive first sheave pressure Pin. Hence, in the hydraulic control system of the continuously variable transmission according to the present embodiment, an excessive increase in line pressure Pl is suppressed at the time of a failure due to an excessive first sheave pressure Pin.

Incidentally, each of the first regulator valve 12, the second regulator valve 13, the modulator valve 14 and the second sheave pressure regulating valve 18 is supplied with an output pressure from itself as a feedback pressure. These valves regulate their output pressures in a feedback manner on the basis of comparison between the output pressures, supplied from themselves as feedback pressures, and the command pressures. For example, in the second sheave pressure regulating valve 18 that receives the second solenoid pressure Psls as a command pressure and outputs the second sheave pressure Pout as an output pressure, a force corresponding to a differential pressure (Pout−α2×Psls) between the second sheave pressure Pout (output pressure) and the product (α2× Psls) of the second solenoid pressure Psls (command pressure) and the gain α2 acts on the valve element. Then, the second sheave pressure Pout is regulated in a feedback manner so that the valve element moves to reduce the differential pressure and thereby the second sheave pressure Pout (output pressure) becomes a value corresponding to the second solenoid pressure Psls (command pressure).

On the other hand, the first sheave pressure regulating valve 17 also regulates the output pressure in a feedback manner in the basically similar manner. However, in the case of the first sheave pressure regulating valve 17, not the first sheave pressure Pin, which is the output pressure from itself, but a hydraulic pressure in the oil passage 24 on the drive pulley 21 side of the orifice 25 (hereinafter, this hydraulic pressure is referred to as "post-orifice output pressure Psf") is supplied as a feedback pressure.

The reason why the first sheave pressure regulating valve 17 is thus configured is as follows. As described above, the first sheave pressure regulating valve 17 uses the first solenoid pressure Pslp as a command pressure, the first sheave pressure Pin as an output pressure and the post-orifice output pressure Psf as a feedback pressure. FIG. 2 shows the first sheave pressure Pin and the post-orifice output pressure Psf over time when the first solenoid pressure Pslp is increased or decreased. As shown in the drawing, with the increase or decrease in the first solenoid pressure Pslp, the first sheave pressure Pin varies to track a required pressure "α1×Pslp+β1" after a constant delay. On the other hand, the post-orifice output pressure Psf tracks the required pressure after a further longer delay than the first sheave pressure Pin because of the interposed fail-safe valve 19 and orifice 25. Here, a force corresponding to a differential pressure between a feedback pressure and the required pressure acts on the valve element of the first sheave pressure regulating valve 17, and the valve element is moved by that force. Thus, the above differential pressure is larger when the post-orifice output pressure Psf is used as a feedback pressure than when the first sheave pressure Pin is used as a feedback pressure. Hence, it is possible to enhance the response of the first sheave pressure regulating valve 17. In addition, the post-orifice output pressure Psf is closer to the hydraulic pressure that is actually applied to the drive pulley 21 than the first sheave pressure Pin. Thus, the hydraulic pressure applied to the drive pulley 21 may be further accurately controlled and, as a result, it is possible for an actual gear ratio to further quickly follow a target gear ratio of the continuously variable transmission.

Note that in the present embodiment, the first regulator valve 12 and the second regulator valve 13 serve as a line pressure regulating portion that regulates the line pressure, which is used for hydraulic control as a source pressure. In addition, the first sheave pressure regulating valve 17 serves as a first sheave pressure regulating valve that regulates the line pressure to obtain a first sheave pressure. Furthermore, in the present embodiment, the first sheave pressure Pin is used as the first sheave pressure that is obtained by regulating the line pressure by the first sheave pressure regulating valve.

With the hydraulic control system of the continuously variable transmission according to the present embodiment as described above, the following advantageous effects may be obtained.

The hydraulic control system according to the present embodiment is equipped with the first sheave pressure regulating valve 17 that regulates the line pressure Pl to obtain the first sheave pressure Pin, and the fail-safe valve 19. Here, the fail-safe valve 19 selectively outputs any one of the first sheave pressure Pin and a fail-safe hydraulic pressure (second sheave pressure Pout) to the drive pulley 21. The fail-safe hydraulic pressure (second sheave pressure Pout) is applied to the drive pulley 21 at the time of a failure due to an excessive first sheave pressure Pin. Then, the first regulator valve 12 and the second regulator valve 13 receive the output pressure Psf from the fail-safe valve 19 as the drive pulley 21 side hydraulic pressure in a feedback manner to regulate the line pressure Pl. Then, at the time of a failure due to an excessive first sheave pressure Pin, the fail-safe valve 19 outputs the second sheave pressure Pout, which is the fail-safe hydraulic pressure, as the output pressure Psf in place of the excessive first sheave pressure Pin. This prevents deterioration in durability of the belt 23, the cylinder of the drive pulley 21, and the like, due to an excessive increase in hydraulic pressure applied to the drive pulley 21. Then, the line pressure Pl at this time is regulated in a feedback manner using the output pressure Psf from the fail-safe valve 19, which is the second sheave pressure Pout, as the drive pulley 21 side hydraulic pressure. Thus, even when the first sheave pressure Pin is excessive, it is possible to prevent the line pressure Pl from becoming excessive in response to the excessive first sheave pressure Pin, to thereby make it possible to avoid an excessive increase in first sheave pressure Pin and line pressure Pl due to the above described vicious cycle. Hence, according to the present embodiment, it is possible to suppress an excessive increase in line pressure Pl at the time of a failure due to an excessive first sheave pressure Pin.

In the present embodiment, the first regulator valve 12 and the second regulator valve 13 regulate the line pressure Pl on the basis of the hydraulic pressure on the fail-safe valve 19 side of the orifice 25 in the oil passage 24 between the fail-safe valve 19 and the drive pulley 21 (hereinafter, this hydraulic pressure is referred to as "pre-orifice output pressure Psf"). The pre-orifice output pressure Psf further quickly tracks a variation in the first sheave pressure Pin in comparison with the above post-orifice output pressure Psf. Thus, it is possible to further quickly increase the line pressure Pl in response to an increase in first sheave pressure Pin at the time of a hard upshift (variation in gear ratio of the continuously variable transmission to increase the speed) and, as a result, it is possible to improve the gear shift speed.

In the present embodiment, the first sheave pressure regulating valve 17 is supplied with the post-orifice output pressure Psf as a feedback pressure. The post-orifice output pressure Psf tracks an increase or decrease in first solenoid pressure Pslp after a delay longer than the first sheave pressure Pin because of the interposed fail-safe valve 19 and orifice 25. Here, a force corresponding to a differential pressure between a feedback pressure and the required pressure acts on the valve element of the first sheave pressure regulating valve 17, and the valve element is moved by that force. Thus, the above differential pressure is larger when the post-orifice output pressure Psf is used as a feedback pressure than when the first sheave pressure Pin is used as a feedback pressure. Hence, it is possible to enhance the response of the first sheave pressure regulating valve 17. In addition, the post-orifice output pressure Psf is closer to the hydraulic pressure that is actually applied to the drive pulley 21 than the first sheave pressure Pin. Thus, the hydraulic pressure applied to the drive pulley 21 may be further accurately controlled and, as a result, it is possible an actual gear ratio to further quickly follow a target gear ratio of the continuously variable transmission.

Figure 3:
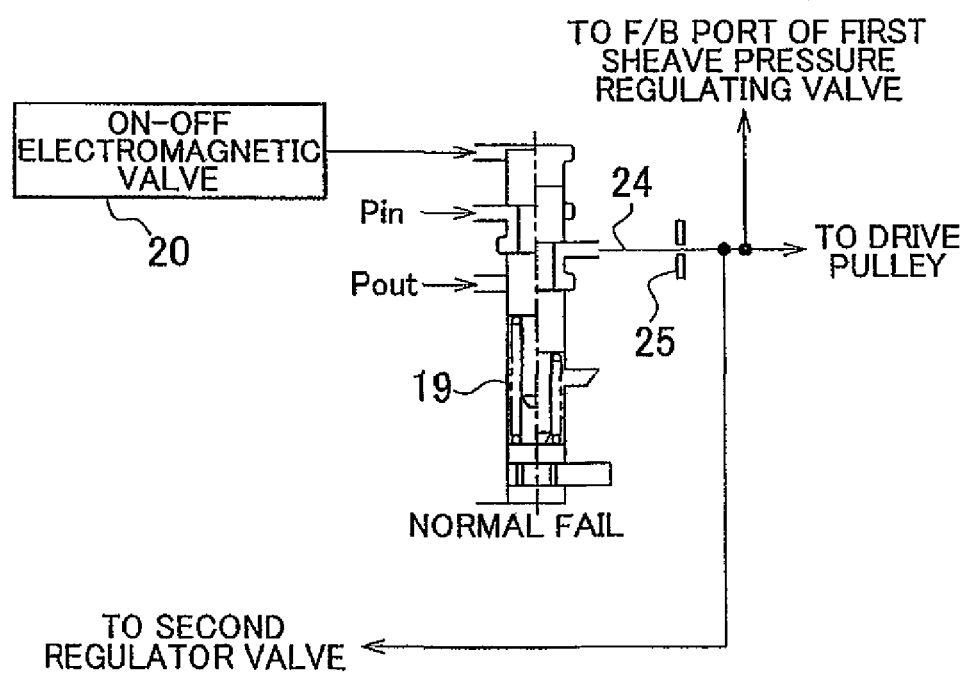
FIG. 3 is a view that schematically shows the configuration of a fail-safe valve and a hydraulic circuit around the fail-safe valve in a hydraulic control system according to a second embodiment of the invention.

A hydraulic control system of a continuously variable transmission according to a second embodiment of the invention will be described focusing on the difference from the above embodiment with further reference to FIG. 3. Note that in the present embodiment and the following embodiment, like reference numerals denote like components to those of the first embodiment, and the detailed description thereof is omitted.

In the first embodiment, the pre-orifice output pressure Psf is supplied to the second regulator valve 13 in a feedback manner as the drive pulley 21 side hydraulic pressure. In the present embodiment, as shown in FIG. 3, a hydraulic pressure in the oil passage 24 on the drive pulley 21 side of the orifice 25 (post-orifice output pressure Psf) is supplied to the second regulator valve 13 in a feedback manner as the drive pulley 21 side hydraulic pressure. That is, in the present embodiment, the first regulator valve 12 and the second regulator valve 13 regulate the line pressure Pl on the basis of the post-orifice output pressure Psf.

The post-orifice output pressure Psf is closer to the hydraulic pressure that is actually applied to the drive pulley 21 than the pre-orifice output pressure Psf (hydraulic pressure in the oil passage 24 on the fail-safe valve 19 side of the orifice 25). Thus, when the post-orifice output pressure Psf is supplied in a feedback manner to regulate the line pressure Pl, it is possible to bring the line pressure Pl further close to an actually required hydraulic pressure and, as a result, it is possible to improve the accuracy of the differential pressure between the line pressure Pl and the hydraulic pressure applied to the drive pulley 21. Thus, the line pressure Pl may be controlled further close to a minimum necessary hydraulic pressure and, as a result, the line pressure Pl may be further reduced by that much. Hence, it is possible to reduce operation of the oil pump 11 to thereby improve fuel economy.

A hydraulic control system of a continuously variable transmission according to a third embodiment of the invention will be described focusing on the difference from the above described embodiments with further reference to FIG. 4.

In the first and second embodiments, the fail-safe valve 19 is provided only at the drive pulley 21 side to handle a failure due to an excessive first sheave pressure Pin. In contrast, in the present embodiment, a fail-safe valve handles a failure due to any one of an excessive first sheave pressure Pin or an excessive second sheave pressure Pout.

Figure 4:
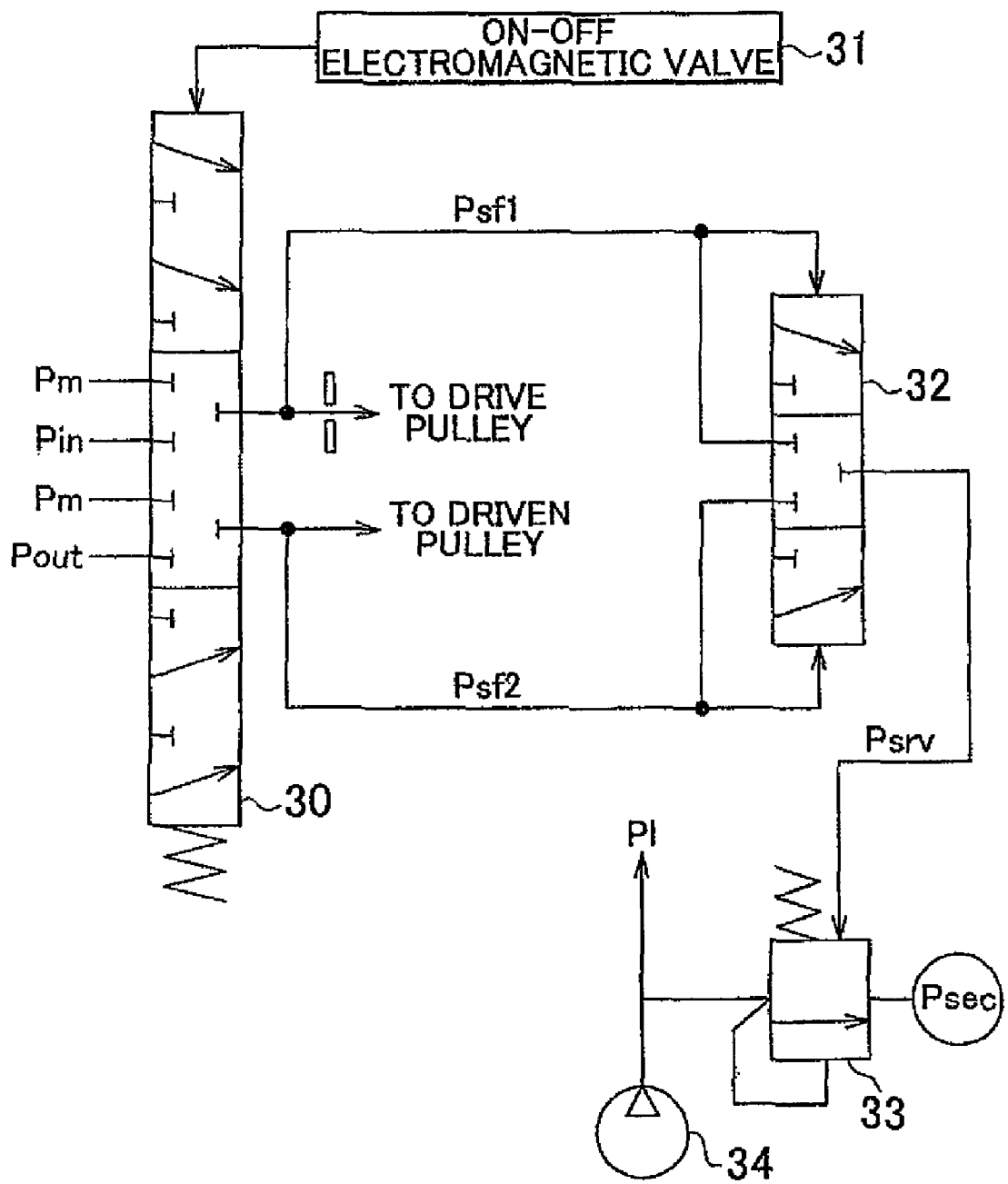
FIG. 4 is a block diagram that shows the configuration of a fail-safe valve and a hydraulic circuit around the fail-safe valve in a hydraulic control system according to a third embodiment of the invention.
Figure 5:
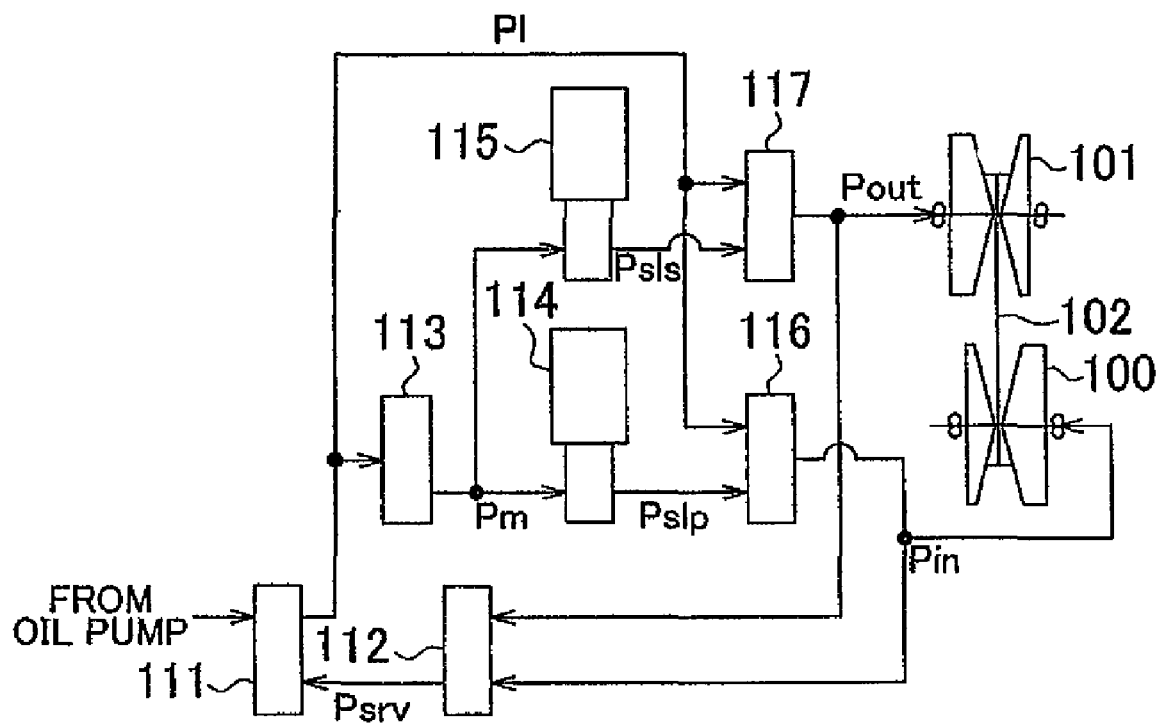
FIG. 5 is a block diagram that schematically shows the overall configuration of an example of an existing hydraulic control system of a continuously variable transmission.
Figure 6:
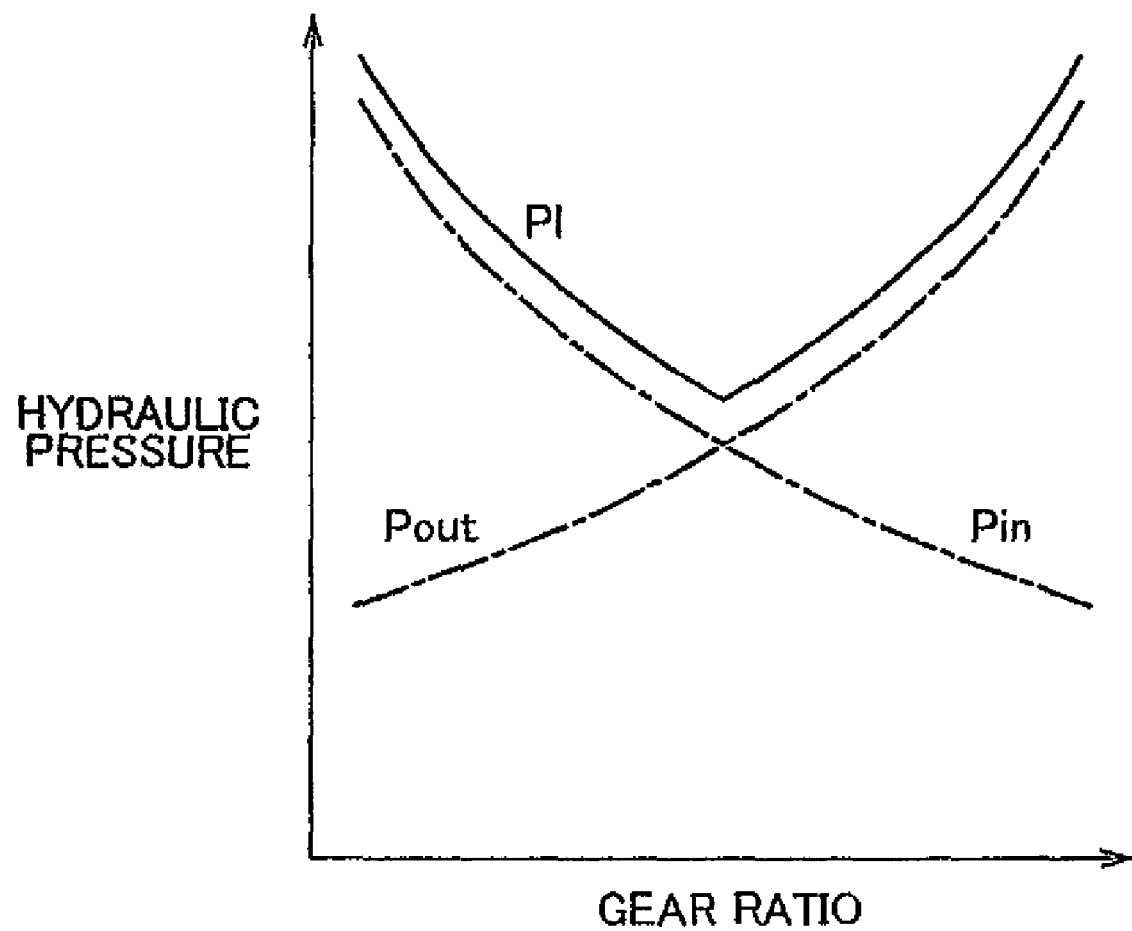
FIG. 6 is a graph that shows the relationship between first and second sheave pressures and a line pressure in regard to the example of the existing hydraulic control system of the continuously variable transmission.
Figure 7:
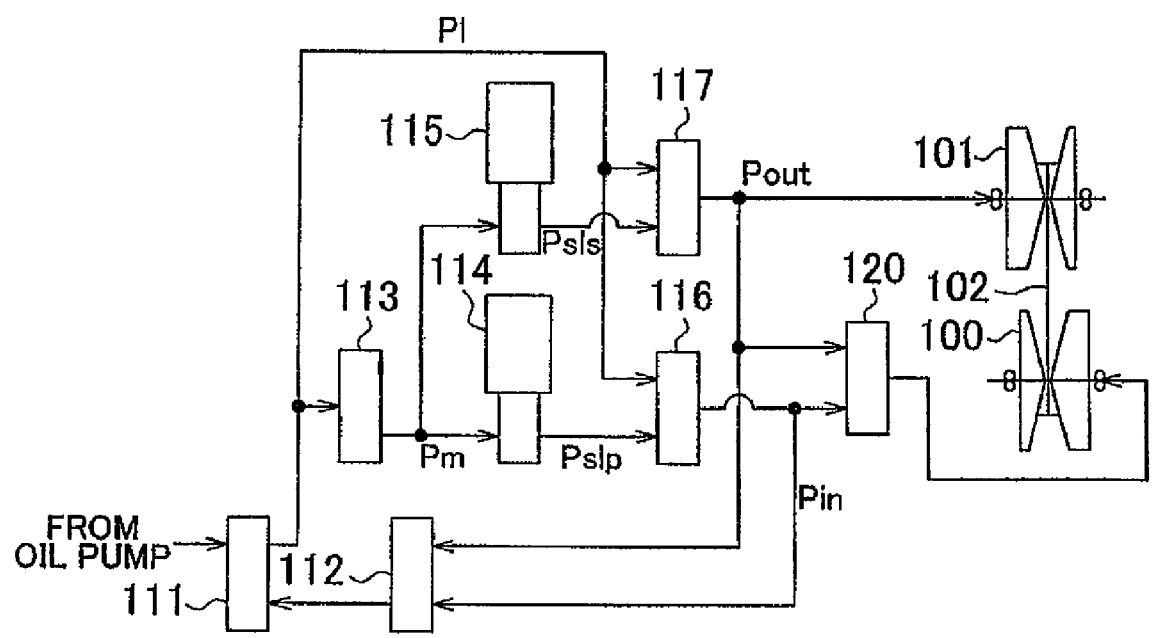
FIG. 7 is a block diagram that schematically shows the overall configuration of an existing hydraulic control system of a continuously variable transmission, which is equipped with a fail-safe valve.

FIG. 4 shows the configuration of a fail-safe valve 30 and a hydraulic circuit around the fail-safe valve 30 in the hydraulic control system of the continuously variable transmission according to the present embodiment. As shown in the drawing, the fail-safe valve 30 has four input ports and two output ports. Two of these input ports of the fail-safe valve 30 respectively introduce the first sheave pressure Pin and the second sheave pressure Pout, and the remaining two input ports each introduce the modulator pressure Pm as a fail-safe hydraulic pressure applied to each of the drive pulley 21 and the driven pulley 22 at the time of a failure due to an excessive sheave pressure. In addition, two output ports of the fail-safe valve 30 are respectively connected to the drive pulley 21 and the driven pulley 22 (see FIG. 1, and the like).

The valve element of the fail-safe valve 30 moves on the basis of whether a hydraulic pressure is applied through the on-off electromagnetic valve 31. Then, the fail-safe valve 30 respectively outputs the first sheave pressure Pin and the second sheave pressure Pout from the two output ports when the on-off electromagnetic valve 31 is turned off, while the fail-safe valve 30 outputs the modulator pressure Pm from the two output ports when the on-off electromagnetic valve 31 is turned on.

The output pressures Psf1 and Psf2 from both output ports of the fail-safe valve 30 are also transmitted to a second regulator valve 32 (selector valve). Then, the second regulator valve 32 outputs the higher one of these output pressures Psf1 and Psf2 as the line pressure regulating hydraulic pressure Psrv.

The line pressure regulating hydraulic pressure Psrv is transmitted to the first regulator valve 33. Then, the first regulator valve 33 regulates the pressure of hydraulic oil pumped by the oil pump 34 on the basis of the line pressure regulating hydraulic pressure Psrv to obtain the line pressure Pl.

In the thus configured hydraulic control system according to the present embodiment, normally, the on-off electromagnetic valve 31 is turned off, and the drive pulley 21 and the driven pulley 22 are respectively supplied with the first sheave pressure Pin and the second sheave pressure Pout from the fail-safe valve 30. The first sheave pressure Pin and the second sheave pressure Pout are input to the second regulator valve 32 (selector valve) at this time, and the higher one of those hydraulic pressures is output as the line pressure regulating hydraulic pressure Psrv. Then, the first regulator valve 33 regulates the line pressure Pl so that the line pressure Pl is slightly higher than the higher hydraulic pressure (MAX(Pin, Pout)).

On the other hand, at the time of a failure due to an excessive first sheave pressure Pin and/or an excessive second sheave pressure Pout, the on-off electromagnetic valve 31 is turned on, and then the drive pulley 21 and the driven pulley 22 both are supplied with the modulator pressure Pm as a fail-safe hydraulic pressure from the fail-safe valve 30. Only the modulator pressure Pm is input to the second regulator valve 32 (selector valve) at this time, and the modulator pressure Pm is output as the line pressure regulating hydraulic pressure Psrv. Thus, even when any one of the first sheave pressure Pin or the second sheave pressure Pout becomes excessive, the line pressure Pl does not become excessive. Hence, in the present embodiment as well, an excessive increase in line pressure Pl at the time of a failure due to an excessive sheave pressure is suppressed.

The above described embodiments may be modified into the following alternative embodiments. In the first and second embodiments, the second sheave pressure Pout is used as a fail-safe hydraulic pressure at the time of a failure due to an excessive first sheave pressure Pin. Instead, a hydraulic pressure other than the second sheave pressure Pout, for example, the modulator pressure Pm, or the like, may be used as a fail-safe hydraulic pressure. In addition, in the third embodiment, the modulator pressure Pm is used as a fail-safe hydraulic pressure at the time of a failure due to an excessive first sheave pressure Pin and/or an excessive second sheave pressure Pout. Instead, a hydraulic pressure other than the modulator pressure Pm may also be used as a fail-safe hydraulic pressure.

In the first and second embodiments, the hydraulic pressure in the oil passage 24 on the drive pulley 21 side of the orifice 25 is supplied to the first sheave pressure regulating valve 17 as a feedback pressure to thereby enhance the response of the first sheave pressure regulating valve 17. However, when the response of the first sheave pressure regulating valve 17 is sufficiently ensured, or the like, the first sheave pressure Pin output from the first sheave pressure regulating valve 17 may be directly supplied to the first sheave pressure regulating valve 17 in a feedback manner.

In the first and second embodiments, the second solenoid pressure Psls is supplied to the second regulator valve 13 in a feedback manner as the driven pulley 22 side hydraulic pressure. Then, in the second regulator valve 13, the line pressure regulating hydraulic pressure Psrv is set by comparison between the output pressure Psf from the fail-safe valve 19 and the second solenoid pressure Psls, and is output to the first regulator valve 12. When the differential pressure accuracy of the line pressure Pl needs to be further improved, or the like, the second sheave pressure Pout may be supplied to the second regulator valve 13 in a feedback manner in place of the second solenoid pressure Psls. In this case as well, when the output pressure Psf from the fail-safe valve 19 is supplied to the second regulator valve 13 in a feedback manner as the drive pulley 21 side hydraulic pressure, it is possible to suppress an excessive increase in line pressure Pl at the time of a failure due to an excessive first sheave pressure Pin. In addition, when a similar fail-safe valve is provided at the driven pulley 22 side and then the output pressure of the fail-safe valve is supplied to the second regulator valve 13 in a feedback manner as the driven pulley 22 side hydraulic pressure, it is possible to appropriately suppress an excessive increase in line pressure Pl at the time of a failure due to an excessive second sheave pressure Pout.

In the first and second embodiments, the fail-safe valve 19 is provided at the drive pulley 21 side, and the output pressure Psf from the fail-safe valve 19 is supplied to the second regulator valve 13 in a feedback manner as the drive pulley 21 side hydraulic pressure. The configuration of the hydraulic control system at the drive pulley 21 side and the configuration of the hydraulic control system at the driven pulley 22 side may be interchanged. That is, the fail-safe valve is provided at the driven pulley 22 side, and the output pressure of the fail-safe valve is supplied to the second regulator valve 13 in a feedback manner as the driven pulley 22 side hydraulic pressure. In this case, it is possible to appropriately suppress an excessive increase in line pressure Pl at the time of a failure due to an excessive second sheave pressure Pout.

In the above embodiments, the line pressure Pl is regulated by two regulator valves, that is, the first regulator valve 12, 33 and the second regulator valve 13, 32. The configuration for regulating the line pressure Pl is not limited to this and may be appropriately modified. In short, as long as the line pressure regulating portion regulates the line pressure Pl on the basis of the output pressure Psf from the fail-safe valve 19, it is possible to suppress an excessive increase in line pressure at the time of a failure due to an excessive sheave pressure.

In the first and second embodiments, the line pressure is regulated on the basis of the output pressure Psf from the fail-safe valve 19. However, even without regulating the line pressure in this manner, when the hydraulic pressure on the drive pulley 21 side of the orifice 25 in the oil passage 24 between the fail-safe valve 19 and the drive pulley 21 is supplied to the first sheave pressure regulating valve 17 as a feedback pressure, it is possible to improve its response and quickly follow a target gear ratio.

When the hydraulic control system is configured as described below, it is possible to enhance the response of the second sheave pressure regulating valve 18 to quickly follow a target gear ratio of the continuously variable transmission. That is, a fail-safe valve is provided between the second sheave pressure regulating valve 18 and the driven pulley 22, and an orifice is provided in an oil passage between the fail-safe valve and the driven pulley. Then, a hydraulic pressure in the above oil passage on the driven pulley side of the orifice is supplied to the second sheave pressure regulating valve 18 as a feedback pressure.

In the first and second embodiments, the orifice 25 is provided in the oil passage 24 between the fail-safe valve 19 and the drive pulley 21. When it is not necessary to prevent a steep reduction in first sheave pressure Pin due to a failure of the first sheave pressure regulating valve 17 or the first solenoid valve 15 or occurrence of a slip of the belt 23 due to a steep reduction in hydraulic pressure applied to the drive pulley 21 at the time when the hydraulic pressure is switched by the fail-safe valve 19, the orifice 25 may be omitted instead.

In the above embodiments, the above description provides an example in which the hydraulic control system according to the aspects of the invention is applied to the belt-type continuously variable transmission mounted on the vehicle. The aspects of the invention may be similarly applied to a continuously variable transmission other than the continuously variable transmission mounted on a vehicle as long as it is a belt-type continuously variable transmission that includes a drive pulley and a driven pulley, around which a belt is wound, and that varies the belt turning radii of the pulleys on the basis of hydraulic pressures applied respectively to pulley halves of those pulleys to shift gears.

The invention claimed is:

1. A hydraulic control system that is applied to a belt-type continuously variable transmission that includes a drive pulley and a driven pulley, around which a belt is wound, and that changes the belt turning radii of the pulleys on the basis of hydraulic pressures applied respectively to the pulleys to shift gears, wherein the hydraulic control system performs hydraulic control to regulate the hydraulic pressures applied respectively to the pulleys, the hydraulic control system comprising:
- a first sheave pressure regulating valve that regulates a line pressure to obtain a first sheave pressure;
- a fail-safe valve that selects and outputs any one of the first sheave pressure and a fail-safe hydraulic pressure to one of the pulleys; and
- a line pressure regulating portion that regulates the line pressure on the basis of an output pressure from the fail-safe valve,
- wherein the line pressure is used as a source pressure for hydraulic control.

2. The hydraulic control system according to claim 1, wherein the fail-safe valve selects the fail-safe hydraulic pressure when the first sheave pressure is higher than a predetermined upper limit pressure.

3. The hydraulic control system according to claim 1, wherein the fail-safe valve selects the fail-safe hydraulic pressure when the first sheave pressure is lower than a predetermined lower limit pressure.

4. The hydraulic control system according to claim 1, further comprising an orifice that is provided in an oil passage between the fail-safe valve and the one of the pulleys.

5. The hydraulic control system according to claim 4, wherein the line pressure regulating portion regulates the line pressure on the basis of a hydraulic pressure in the oil passage on a fail-safe valve side of the orifice.

6. The hydraulic control system according to claim 1, further comprising an orifice that is provided in an oil passage between the fail-safe valve and the one of the pulleys, wherein the line pressure regulating portion regulates the line pressure on the basis of a hydraulic pressure in the oil passage on the one of the pulleys side of the orifice.

7. The hydraulic control system according to claim 1, wherein the one of the pulleys is the drive pulley.

8. The hydraulic control system according to claim 1, further comprising a second sheave pressure regulating valve that outputs a second sheave pressure, wherein
the fail-safe hydraulic pressure is the second sheave pressure.

9. A hydraulic control system of a belt-type continuously variable transmission that includes a drive pulley and a driven pulley, around which a belt is wound, and that changes the belt turning radii of the pulleys on the basis of hydraulic pressures applied respectively to the pulleys to shift gears, the hydraulic control system comprising:
- a first sheave pressure regulating valve that regulates a line pressure to obtain a first sheave pressure output to the drive pulley;
- a second sheave pressure regulating valve that regulates the line pressure to obtain a second sheave pressure output to the driven pulley;
- a fail-safe valve that selects and outputs the first sheave pressure to the drive pulley and the second sheave pressure to the driven pulley or selects and outputs a fail safe hydraulic pressure to both the drive pulley and the driven pulley; and
- a line pressure regulating portion that regulates the line pressure on the basis of an output pressure from the fail-safe valve,
- wherein the line pressure is used as a source pressure for hydraulic control.

10. The hydraulic control system according to claim 9, wherein the fail-safe valve selects the fail-safe hydraulic pressure when the sheave pressure is higher than a predetermined upper limit pressure.

11. The hydraulic control system according to claim 9, wherein
the fail-safe valve selects and outputs any one of the first sheave pressure and the fail-safe hydraulic pressure to the drive pulley and the line pressure regulating portion as a first output pressure, and the fail-safe valve selects and outputs any one of the second sheave pressure and the fail-safe hydraulic pressure to the driven pulley and the line pressure regulating portion as a second output pressure, and
the line pressure regulating portion regulates the line pressure on the basis of the higher one of the first output pressure and the second output pressure.

12. The hydraulic control system according to claim 9, further comprising an orifice that is provided in an oil passage between the fail-safe valve and the drive pulley, wherein a hydraulic pressure in the oil passage on a fail-safe valve side of the orifice is input to the line pressure regulating portion.

13. The hydraulic control system according to claim 9, further comprising an orifice that is provided in an oil passage between the fail-safe valve and the drive pulley, wherein a hydraulic pressure in the oil passage on a drive pulley side of the orifice is input to the line pressure regulating portion.

14. A hydraulic control method that is applied to a belt-type continuously variable transmission that includes a drive pulley and a driven pulley, around which a belt is wound, and that changes the belt turning radii of the pulleys on the basis of hydraulic pressures applied respectively to the pulleys to shift gears, wherein the hydraulic control method is used to perform hydraulic control to regulate the hydraulic pressures applied respectively to the pulleys, the hydraulic control method comprising:
- regulating a line pressure, which is used for the hydraulic control as a source pressure, to obtain a sheave pressure;
- selecting and outputting any one of the sheave pressure and a fail-safe hydraulic pressure to one of the pulleys; and
- regulating the line pressure on the basis of the selected one of the sheave pressure and the fail-safe hydraulic pressure.

* * * * *